United States Patent
Jayakar et al.

(10) Patent No.: US 12,060,025 B2
(45) Date of Patent: Aug. 13, 2024

(54) ROOF MOUNTED PASSENGER AIRBAG WITH LOWER LEG PROTECTION

(71) Applicant: ZF Passive Safety Systems US Inc., Washington, MI (US)

(72) Inventors: Hylus Ranjit Raj Jayakar, Washington Township, MI (US); Kurt F. Fischer, Rochester, MI (US); Douglas Gould, Lake Orion, MI (US); Gabriela Diaz, Sterling Heights, MI (US)

(73) Assignee: ZF PASSIVE SAFETY SYSTEMS US INC., Washington, MI (US)

( * ) Notice: Subject to any disclaimer, the term of this patent is extended or adjusted under 35 U.S.C. 154(b) by 0 days.

(21) Appl. No.: 17/613,510

(22) PCT Filed: Mar. 18, 2020

(86) PCT No.: PCT/US2020/023262
§ 371 (c)(1),
(2) Date: Nov. 23, 2021

(87) PCT Pub. No.: WO2020/242558
PCT Pub. Date: Dec. 3, 2020

(65) Prior Publication Data
US 2022/0250573 A1 Aug. 11, 2022

Related U.S. Application Data

(60) Provisional application No. 62/853,220, filed on May 28, 2019.

(51) Int. Cl.
*B60R 21/214* (2011.01)
*B60R 21/00* (2006.01)
*B60R 21/232* (2011.01)

(52) U.S. Cl.
CPC .......... *B60R 21/214* (2013.01); *B60R 21/232* (2013.01); *B60R 2021/0044* (2013.01);
(Continued)

(58) Field of Classification Search
CPC ... B60R 21/214; B60R 21/232; B60R 21/233; B60R 2021/0044; B60R 2021/0048;
(Continued)

(56) References Cited

U.S. PATENT DOCUMENTS 2,834,609 A * 5/1958 Bertrand ............... B60R 21/268
251/30.01
3,664,682 A * 5/1972 Wycech ................. B60R 21/08
280/734

(Continued)

FOREIGN PATENT DOCUMENTS

GB 2364674 A 2/2002

OTHER PUBLICATIONS

PCT International Search Report for corresponding International Application Serial No. PCT/US2020/023262, mailed Jun. 12, 2020, pp. 1-2.

*Primary Examiner* — Laura Freedman
(74) *Attorney, Agent, or Firm* — Tarolli, Sundheim, Covell & Tummino LLP

(57) ABSTRACT

An apparatus and method for helping to protect occupants of an autonomous vehicle in the event of a collision. An airbag has a stored, pre-deployment condition in a vehicle roof. The airbag is deployable downward toward the vehicle floor in front of a vehicle occupant. The airbag includes an upper portion for receiving the occupant's head and torso. A lower portion extends downward and forward from the upper portion. The lower portion is for receiving the occupant's lower legs.

20 Claims, 3 Drawing Sheets

(52) U.S. Cl.
CPC ............... *B60R 2021/0048* (2013.01); *B60R 2021/0053* (2013.01)

(58) Field of Classification Search
CPC .. B60R 2021/0053; B60R 2021/23161; B60R 2021/23169; B60R 2021/23308
See application file for complete search history.

(56) References Cited

U.S. PATENT DOCUMENTS

| | | | |
|---|---|---|---|
| 5,458,367 A | 10/1995 | Marts et al. | |
| 6,283,500 B1 | 9/2001 | Eckert et al. | |
| 8,573,634 B2* | 11/2013 | Choi | B60R 21/232 280/730.2 |
| 9,446,733 B2* | 9/2016 | Pausch | B60R 21/2334 |
| 9,725,064 B1* | 8/2017 | Faruque | B60N 2/143 |
| 9,789,840 B2* | 10/2017 | Farooq | B60R 21/231 |
| 9,902,362 B2* | 2/2018 | Farooq | B60N 2/14 |
| 9,994,182 B1* | 6/2018 | Jaradi | B60R 21/214 |
| 10,343,642 B2* | 7/2019 | Faruque | B60R 21/214 |
| 10,583,799 B2* | 3/2020 | Schneider | B60R 21/2338 |
| 10,625,701 B2* | 4/2020 | Cho | B60R 21/214 |
| 10,688,955 B2* | 6/2020 | Shin | B60R 21/214 |
| 10,857,965 B2* | 12/2020 | Abe | B60R 21/214 |
| 11,117,540 B2* | 9/2021 | Hwangbo | B60R 21/261 |
| 11,142,157 B2* | 10/2021 | Kim | B60N 2/002 |
| 11,267,431 B2* | 3/2022 | Sekizuka | B60R 21/26 |
| 11,498,509 B2* | 11/2022 | Fischer | B60R 21/2176 |
| 2017/0113646 A1 | 4/2017 | Lee et al. | |
| 2018/0272985 A1* | 9/2018 | Nagasawa | B60R 21/231 |
| 2019/0054884 A1 | 2/2019 | Dry et al. | |
| 2021/0031718 A1* | 2/2021 | Schultz | B60R 21/231 |
| 2022/0144203 A1* | 5/2022 | Sung | B60R 21/213 |
| 2022/0212622 A1* | 7/2022 | Gould | B60R 21/216 |
| 2022/0340098 A1* | 10/2022 | Zhou | B60R 21/232 |
| 2023/0026681 A1* | 1/2023 | Fischer | B60R 21/232 |

* cited by examiner

ROOF MOUNTED PASSENGER AIRBAG WITH LOWER LEG PROTECTION

RELATED APPLICATION

This application claims the benefit of U.S. Provisional Application Ser. No. 62/853,220, filed on May 28, 2019, the disclosure of which is hereby incorporated by reference in its entirety.

BACKGROUND

It is known to provide an inflatable vehicle occupant protection device, such as an airbag, for helping to protect an occupant of a vehicle. One particular type of airbag is a frontal airbag inflatable between an occupant of a front seat of the vehicle and an instrument panel of the vehicle. Such airbags may be driver airbags or passenger airbags. When inflated, the driver and passenger airbags help protect the occupant from impacts with parts of the vehicle such as the instrument panel and/or a steering wheel of the vehicle.

Passenger airbags are typically stored in a deflated condition in a housing that is mounted to the vehicle instrument panel. An airbag door is connectable with the housing and/or instrument panel to help enclose and conceal the airbag in a stored condition. Upon deployment of the passenger airbag, the airbag door opens to permit the airbag to move to an inflated condition. The airbag door opens as a result of forces exerted on the door by the inflating airbag.

Driver airbags are typically stored in a deflated condition in a housing that is mounted on the vehicle steering wheel. An airbag cover is connectable with the housing and/or steering wheel to help enclose and conceal the airbag in a stored condition. Upon deployment of the driver airbag, the airbag cover opens to permit the airbag to move to an inflated condition. The airbag cover opens as a result of forces exerted on the cover by the inflating driver airbag.

There are trends in the auto industry to make vehicles more spacious. Styling has been making the instrument panel smaller and thus farther away from the occupant. Looking further into the future, driverless, autonomous vehicles are even more spacious. Autonomous vehicles have been contemplated for some time, and now their adaption on a large scale is approaching. Autonomous vehicles can eliminate some of the structure traditionally relied upon for supporting various vehicle safety devices.

With these realities as a backdrop, the paradigm of occupant safety systems must shift. In the past, the necessity of a vehicle operator/driver lent to a somewhat standard vehicle passenger cabin configuration. In the U.S., the driver is a front seat, left side, forward facing occupant within reach of the vehicle controls and instrumentation (steering wheel, pedals, instrument panel, console, etc.). This driver configuration helps dictate the layout of the remainder of the vehicle—front seat, forward-facing passenger-side occupant, rear seat (second row, third row, etc.) forward-facing occupants. Accordingly, in the past, occupant safety systems were typically designed with this passenger cabin layout and the associated occupant positions and orientations in mind.

The autonomous vehicle eliminates the operator/driver, which eliminates the necessity of their being positioned and oriented in the conventional manner. Vehicle manufacturers are free utilize passenger cabin space as they see fit without being constrained to predetermined passenger arrangements, such as all forward-facing occupants, or vehicle structural configurations, such as steering wheel/instrument panel configurations, center console configurations, foot well pedal controls, etc.

This presents the challenge of not only where to locate airbag systems, but also finding a reaction surface against which to position the airbag so that it can absorb impacts. Typically, instrument panel and steering wheel mounted frontal airbags utilize those structures as a reaction surface against which the airbag rests so that it can oppose, cushion, and absorb the impact energy of an impacting occupant and provide a desired ride-down effect. In the autonomous vehicles, however, the vehicle may not have an instrument panel or steering wheel at all, and the occupants can be positioned and oriented outside the traditional manner. This can make it difficult or impossible to utilize traditional structures in the vehicle as reaction surface.

SUMMARY

An apparatus for helping to protect occupants of an autonomous vehicle in the event of a collision includes an airbag. The airbag has a stored, pre-deployment condition in a vehicle roof. The airbag is deployable downward from the vehicle roof toward the vehicle floor in front of a vehicle occupant. The airbag includes an upper portion configured to receive the occupant's head and torso, and a lower portion that extends downward and forward from the upper portion. The lower portion is configured to receive the occupant's lower legs.

According to one aspect, the airbag can be configured so that the occupant's head and torso impacting the upper portion produces a rotation of the airbag that results in the lower portion exerting a downward force on the occupant's lower legs.

According to another aspect, alone or in combination with any other aspect, the lower portion can be configured to engage the occupant's lower leg and resist forward and upward swinging of the lower legs about the knee.

According to another aspect, alone or in combination with any other aspect, the lower portion can be configured to engage the occupant's lower leg in the area of the tibia so that the force of forward and upward swinging of the lower leg about the knee is distributed over a large area of the lower leg structure.

According to another aspect, alone or in combination with any other aspect, the upper portion of the airbag can be configured to pivot or rotate forward in response to forward movement of the occupant's head and torso. This forward pivotal/rotational movement can be configured to produce forward and downward movement of the lower portion of the airbag in opposition to forward and upward swing of the occupant's lower leg about the knee.

According to another aspect, alone or in combination with any other aspect, the airbag can be configured to maintain a level of pressurization such that the lower portion can resist movement relative to the upper portion in response to forward and upward swing of the occupant's lower legs about the knee.

According to another aspect, alone or in combination with any other aspect, the lower portion can be configured to branch off from the upper portion and extend forward and downward from the upper portion.

According to another aspect, alone or in combination with any other aspect, the upper portion can be configured to extend downward from the vehicle roof in front of the occupant's head and torso, terminating adjacent the occupant's upper legs, and the lower portion can be configured to branch off from the upper portion at a location above a terminal lower end of the upper portion.

A method for helping to protect an occupant of a seat in an autonomous vehicle in the event of a collision can include deploying an airbag downward from a vehicle roof to a deployed position in front of the occupant. The method can also include configuring an upper portion of the airbag to be positioned to receive the occupant's head and torso when in the deployed position. The method can further include configuring a lower portion of the airbag to extend downward and forward from the upper portion and be positioned to receive the occupant's lower legs when in the deployed position.

According to one aspect, the method can also include configuring the airbag so that the occupant's head and torso impacting the upper portion produces a rotation of the airbag that results in the lower portion exerting a downward force on the occupant's lower legs.

According to another aspect, alone or in combination with any other aspect, the method can also include configuring the lower portion to engage the occupant's lower leg and resist forward and upward swinging of the lower legs about the knee.

According to another aspect, alone or in combination with any other aspect, the method can also include configuring the lower portion to engage the occupant's lower leg in the area of the tibia so that the force of forward and upward swinging of the lower leg about the knee is distributed over a large area of the lower leg structure.

According to another aspect, alone or in combination with any other aspect, the method can also include configuring the upper portion of the airbag to pivot or rotate forward in response to forward movement of the occupant's head and torso. This forward pivotal/rotational movement can be configured to produce forward and downward movement of the lower portion of the airbag in opposition to forward and upward swing of the occupant's lower leg about the knee.

According to another aspect, alone or in combination with any other aspect, the method can also include pressurizing the airbag to a level such that the lower portion can resist movement relative to the upper portion in response to forward and upward swing of the occupant's lower legs about the knee.

According to another aspect, alone or in combination with any other aspect, the method can also include configuring the lower portion to branch off from the upper portion and extend forward and downward from the upper portion.

According to another aspect, alone or in combination with any other aspect, the method can also include configuring the upper portion to extend downward from the vehicle roof in front of the occupant's head and torso and terminate adjacent the occupant's upper legs. The method can also include configuring the lower portion to branch off from the upper portion at a location above a terminal lower end of the upper portion.

DRAWINGS

DESCRIPTION

Figure 1:
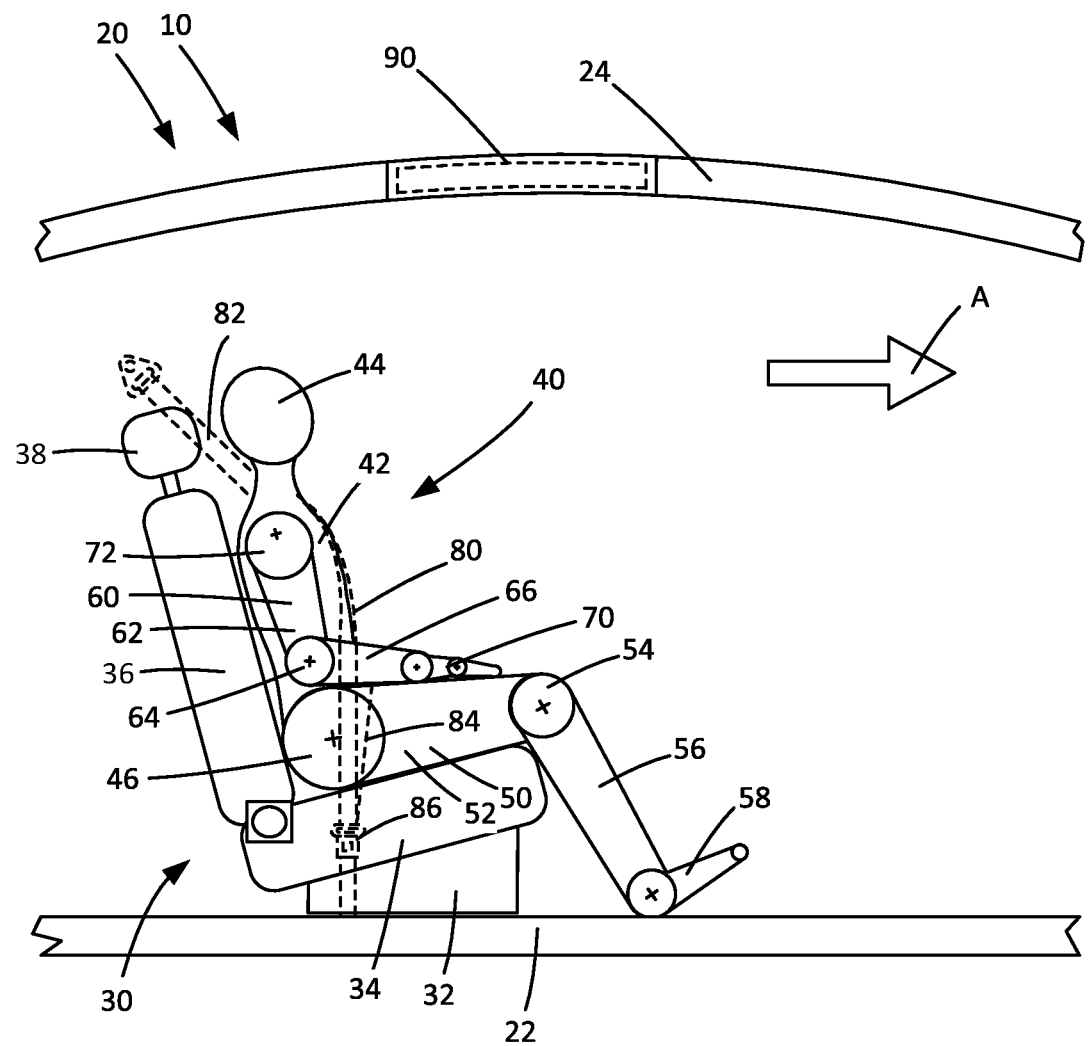
FIG. 1 is a schematic illustration of a vehicle including a vehicle occupant safety system depicting the system in a pre-deployment condition.

One particular scenario where challenges arise due to autonomous vehicle configurations is in the area of leg protection. Referring to FIG. 1, an autonomous vehicle 20 includes a vehicle seat 30 upon which a vehicle occupant 40 is seated. The vehicle seat 30 includes a base 32 connected to the vehicle 20, e.g., to the floor 22. The seat base 32 supports a seat bottom 34. A seatback 36 extends upward from the seat bottom 34 and has a reclined position that can be adjusted. A headrest 38 is positioned at an upper end of the seatback 36.

The occupant 40 is seated on the seat 30, with his/her torso 42 resting on the seatback 36, head 44 positioned at or near the headrest 38, and buttocks 46 and legs 50 (more specifically upper legs 52) resting on the base 32. The occupant's lower legs 56 extend from the knee 54 downward toward the vehicle floor 22, where the occupant's feet 58 rest. In the typical occupant position of FIG. 1, the occupant's arms 60 are at his/her side, with the upper arms 62 adjacent and parallel to the torso 42, bent at the elbows 64 with the lower arms/forearms 66 and hands 70 resting on the upper legs 52.

Figure 2:
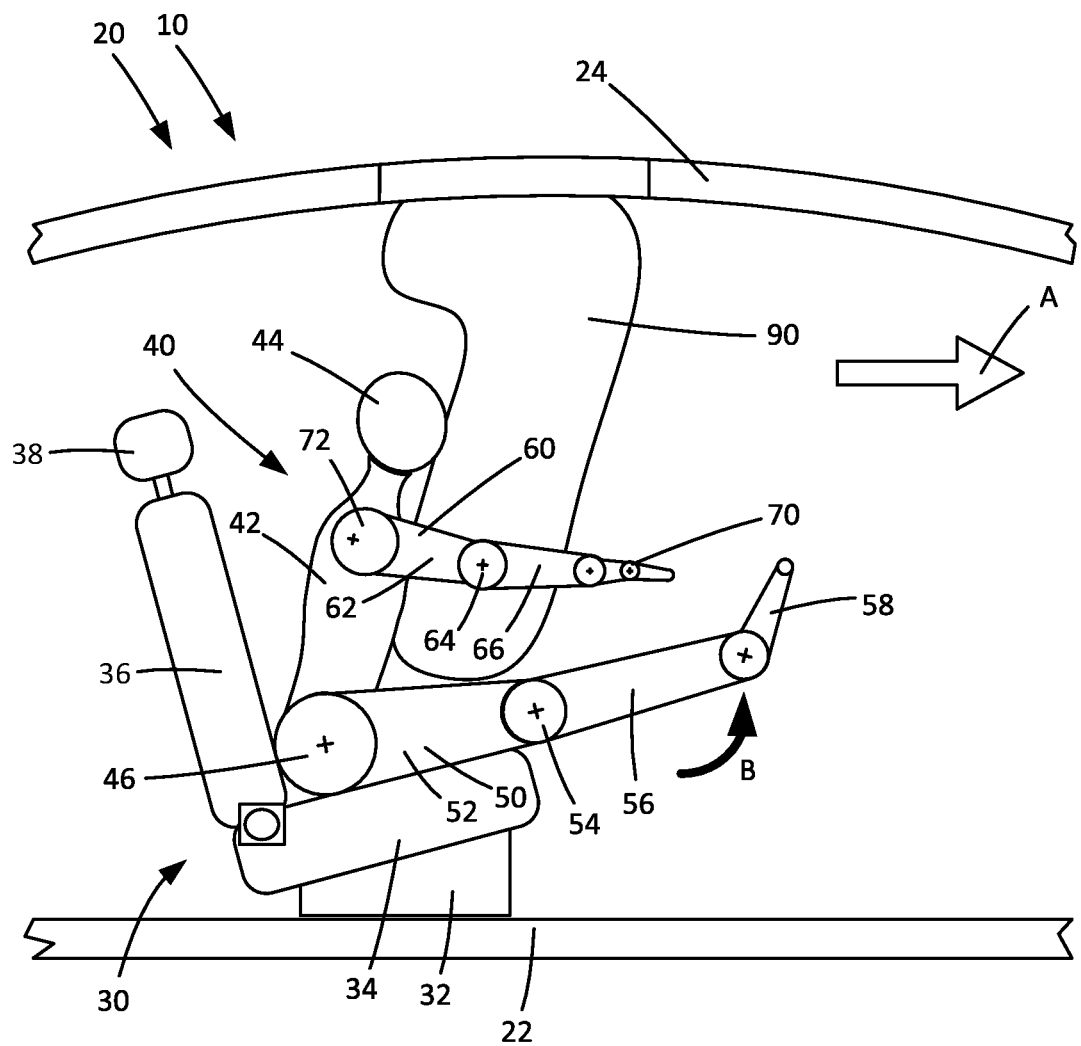
FIG. 2 is a schematic illustration of the vehicle depicting the vehicle occupant safety system in a deployed condition, according to a first configuration of the system.
Figure 3:
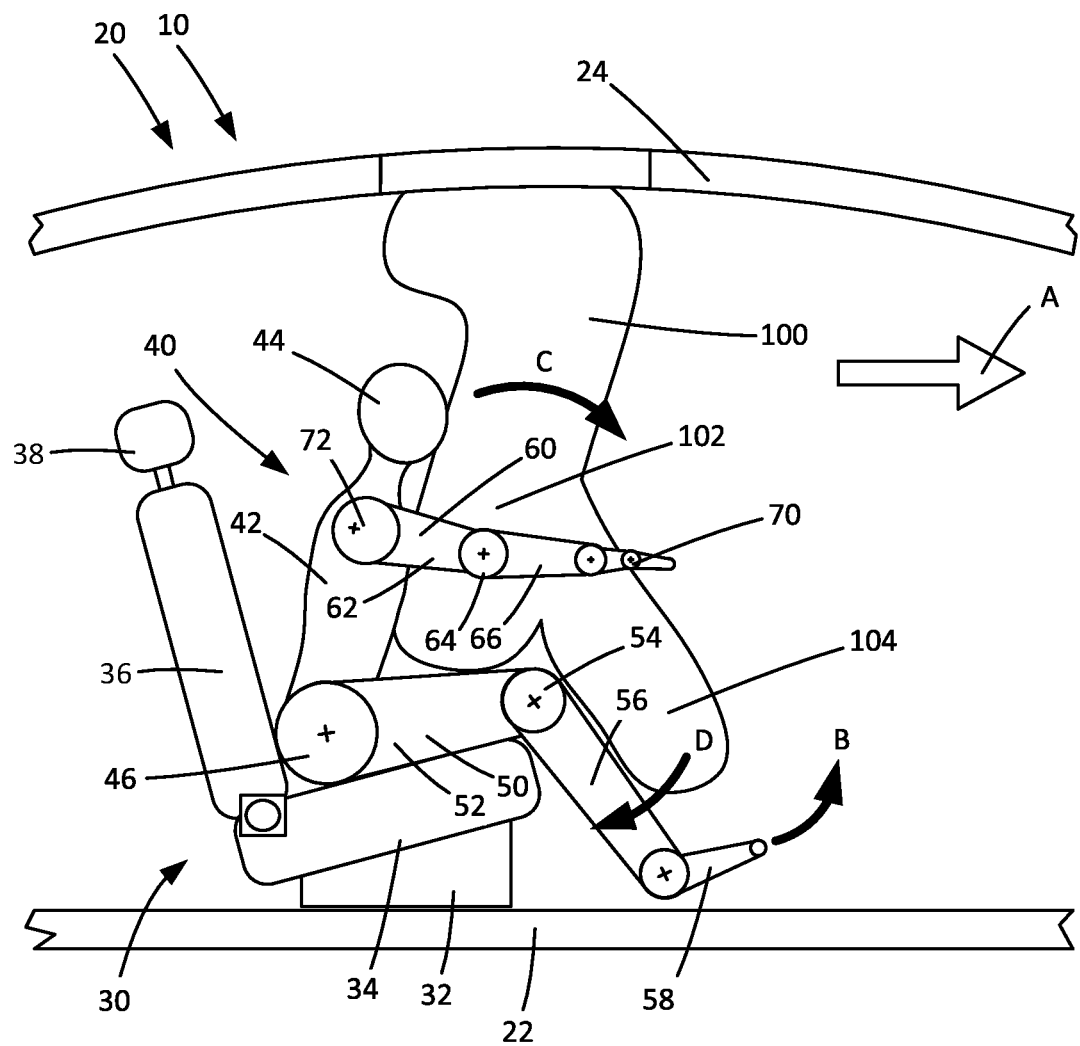
FIG. 3 is a schematic illustration of the vehicle depicting the vehicle occupant safety system in a deployed condition, according to a second configuration of the system.

As shown in FIG. 1, the occupant 40 is restrained by a seatbelt 80, which is a conventional three-point restraint including a shoulder belt portion 82 that extends across the occupant's shoulder 72, and a lap belt portion 84 that extends across the occupant's lap, i.e., where the upper legs 52 meet the torso 42. The seatbelt 80 is secured via a buckle 86, which is anchored to the vehicle 20. To simplify the drawings, the seatbelt 80 is not illustrated in FIGS. 2-3. In FIGS. 2-3, the occupant 40 is wearing a seatbelt, it just isn't shown in the figures. The occupant movements illustrated and described with reference to FIGS. 2-3 are therefore those that would take place with normal use of the seatbelt 80 illustrated in FIG. 1.

Referring to FIGS. 1 and 2, a vehicle safety system 10 helps protect the occupant 40 of the autonomous vehicle 20. As shown in FIGS. 1 and 2, the system 10 includes an airbag 90 mounted in a roof 24 of the vehicle 20. Being an autonomous vehicle 20, the passenger compartment or cabin is without operator controls, such as a steering wheel, pedals, instrumentation, center console, etc., and thus represents an autonomous vehicle. Accordingly, the instrument panel is reduced in size and/or removed altogether in order to maximize the space in the cabin. Control interfaces for climate controls, GPS, navigation, entertainment, etc. can, for example, be provided in a center console area of the vehicle 20 located between the passengers of the front and/or rear rows.

In this open passenger cabin configuration, vehicle seats 30 can be configured, positioned, and arranged in a variety of manners, not constrained by the need to facilitate a vehicle driver/operator. For example, in FIG. 1, the seat 30 is a forward-facing seat, facing in the direction of forward vehicle travel indicated generally by the arrow labeled A. As another example (not shown), the seats 30 can be arranged facing each other, with a front row facing rearward toward a rear row.

For the conventional, forward-facing seating arrangement of FIG. 1, in the event of a frontal crash, the occupant 40 is urged forward in the vehicle, as shown in FIG. 2. As shown in FIG. 2, the airbag 90 restrains the occupant 40, particularly the head 44 and torso 42, without restraining the arms 60 and legs 50. As a result, it can be seen that the legs 50 become extended due to inertia, as indicated generally by the arrow labeled B. This can stress the legs 50, such as hyperextension of the knees 54. Non-autonomous vehicles had structure for blocking this motion, such as the instrument panel/footwell (front passengers) and seatbacks of forward seating (rear passengers). Autonomous vehicles may not include these features.

Referring to FIG. 3, the vehicle safety system 10 includes an airbag 100 that provides lower leg protection. In the example configuration of FIG. 3, the airbag 100 is stored in the vehicle roof 24 and is inflatable downward toward the floor 22 in front of the occupant 40. The airbag 100 can, for example, be operatively connected to an inflator that is actuatable to inflate and deploy the airbag. The inflator can be operatively to an airbag control unit ("ACU") that actuates the inflator to inflate and deploy the airbag 100 in response to the sensed vehicle collision.

The airbag 100 is configured to engage the occupant's legs 50 when deployed. The airbag 100 includes an upper, head/torso engaging portion 102 and a lower, leg engaging portion 104. The leg engaging portion 104 extends or branches downward and forward from the head/torso engaging portion 102 so as to become positioned in front of the occupant's lower legs 56 above the feet 58. The size, shape, proportions, positioning, extent, etc. of the upper and lower portions 102, 104 of the airbag 100 are for purposes of example illustration and give an idea of the relative size, shape proportions, positioning, extent, etc. of those portions. Those skilled in the art will appreciate that these are not limiting and that the relative size, shape proportions, positioning, extent, etc. of the upper and lower portions 102, 104, and the airbag 100 itself, can vary.

The airbag 100 can be constructed of any suitable material, such as nylon (e.g., woven nylon 6-6 yarns), and may be constructed in any suitable manner. For example, the airbag may include one or more pieces or panels of material. If more than one piece or panel is used, the pieces or panels may be interconnected by known means, such as stitching, ultrasonic welding, heat bonding, or adhesives, to form the airbag. The airbag may be uncoated, coated with a material, such as a gas impermeable urethane, or laminated with a material, such as a gas impermeable film. The airbag thus may have a gas-tight or substantially gas-tight construction. Those skilled in the art will appreciate that alternative materials, such as polyester yarn, and alternatives coatings, such as silicone, may also be used to construct the airbag.

Upon sensing the occurrence of an event for which inflation of the airbag is desired, such as a vehicle collision, the ACU provides signals to the inflators. Upon receiving the signals from the ACU, the inflators are actuated and provide inflation fluid to the inflatable volumes of the airbag 100 in a known manner. The inflating airbags exert a force on their respective housings, which causes the housings to open. This releases the airbags inflate and deploy from their stored conditions in their respective housings to their respective deployed conditions. The airbags, while inflated, help protect the vehicle occupants 40 by absorbing the impact of the occupants. This can be achieved in a variety of manners.

In the example configuration of FIG. 3, for purposes of illustrating the example configuration, the vehicle has a single forward facing seat 30 upon which the occupant 40 is seated. In a collision in which the vehicle 20 and the occupant 40 are moving in a forward direction indicated generally by the arrow labeled "A" in FIG. 3. In response to this movement, the occupant's lower leg 56 tends to swing up, as indicated generally by the arrow labeled "B" in FIG. 3.

The lower portion 104 of the airbag 100 is configured to engage the lower leg 56 and restrain the lower leg against the movement of arrow B. The lower portion 104 engages the tibia (the large bone of the lower leg 56) so that the force of the moving lower leg is distributed over a large area of the lower leg structure.

At the same time, the occupant's head 44 and torso 42 engage the upper portion 102 of the airbag 100. The movement of the head 44 and torso 42 are indicated generally by the arrow labeled "C" in FIG. 3. Arrow C therefore also represents the movement that is imparted on the upper portion 102 of the airbag 100 by the impacting occupant 40. The movement of the upper portion 102 in the direction of arrow C causes a pivoting or rotation of the airbag 100 that results in a corresponding pivoting or rotation of the lower portion 104 of the airbag in the direction indicated generally by the arrow labeled "D" in FIG. 3.

Due to the pressurization of the airbag 100, the upper and lower portions 102, 104 can have a stiffness sufficient to result in their ability to produce forces in reaction to the impacting occupant 40 that are sufficient to afford a desired level of restraint and protection. Because of this stiffness, the rotation (arrow D) of the lower portion 104 can restrict the swinging motion (arrow C) of the occupant's lower leg 56. The motion of the lower portion (arrow D) can push downward/rearward on the lower legs 56 in opposition of their movement in response to crash forces.

As a result, vehicle testing of the airbag 100 produced crash test data indicating that the tibia index, which is used to measure the effectiveness of lower leg protection by measuring accelerations of the lower legs of crash test dummies, can be below and even substantially below 100%. Presently, lower than 100% is the benchmark for effective lower leg protection.

From the above description of the invention, those skilled in the art will perceive improvements, changes and modifications to the disclosed system and methods that fall within the spirit and scope of the invention. These improvements, changes, and/or modifications are intended to be covered by the appended claims.

We claim:

1. An apparatus for helping to protect an occupant of a vehicle seat in a vehicle in the event of a collision that results in forward movement of the occupant relative to the seat, the seat being mounted on a vehicle floor and including a seat base and a seatback, the apparatus comprising:

an airbag having a stored, pre-deployment condition in a roof of the vehicle above the seat, the airbag being inflatable downward from the vehicle roof toward the vehicle floor to a deployed condition, the airbag comprising:

an upper portion configured to, in the deployed condition, extend from the roof down in front of the seatback and terminate above the seat base, the upper portion comprising a rear surface that faces the seatback and a front surface that faces away from the seatback; and a lower portion configured to, in the deployed condition, extend downward and forward from the front surface of the upper portion, the lower portion being configured to, in the deployed condition, extend in front of the seat base and below an upper surface of the seat base;

wherein the upper portion is configured to receive a head and torso of the occupant when moving forward in response to the collision, wherein the lower portion is configured to receive lower legs of the occupant when moving forward in response to the collision, the lower legs being positioned forward of the seat base and extending below the upper surface of the seat base with feet of the occupant resting on the vehicle floor, and wherein the airbag is configured so that the occupant's head and torso moving forward into engagement with the upper portion produces a rotation of the airbag that results in the lower portion exerting a downward force on the occupant's lower legs.

2. The apparatus recited in claim 1, wherein the lower portion is configured to engage the occupant's lower legs and resist forward and upward swinging of the lower legs about knees of the occupant.

3. The apparatus recited in claim 1, wherein the lower portion is configured to engage the occupant's lower legs in an area of tibias of the lower legs so that forces of forward and upward swinging of the lower legs about knees of the occupant are distributed over a large area of the lower legs.

4. The apparatus recited in claim 1, wherein the upper portion of the airbag is configured to pivot and/or rotate forward in response to forward movement of the occupant's head and torso, and wherein the forward pivotal and/or rotational movement is configured to produce forward and downward movement of the lower portion of the airbag in opposition to forward and upward swing of the occupant's lower legs about knees of the occupant.

5. The apparatus recited in claim 4, wherein the airbag is configured to maintain a level of pressurization such that the lower portion can resist movement relative to the upper portion in response to forward and upward swing of the occupant's lower legs about the knees of the occupant.

6. The apparatus recited in claim 1, wherein the upper portion is configured to extend downward from the vehicle roof in front of the occupant's head and torso, terminating adjacent and above upper legs of the occupant, and the lower portion branches off from the upper portion at a location above a terminal lower end of the upper portion.

7. The apparatus recited in claim 1, wherein the upper portion is configured to engage the vehicle roof when inflated and to maintain engagement with the vehicle roof throughout deployment.

8. The apparatus recited in claim 1, wherein the upper portion is configured to extend downward and rearward from the vehicle roof when inflated, and the lower portion is configured to extend downward and forward from the upper portion when inflated.

9. The apparatus recited in claim 1, wherein the airbag is configured to be free from engagement with vehicle structure against which the airbag is pinned in response to occupant penetration into the airbag when inflated.

10. The apparatus recited in claim 1, wherein the airbag is configured to help protect an occupant that is wearing a seatbelt.

11. A method for helping to protect an occupant of a vehicle seat in a vehicle in the event of a collision that results in forward movement of the occupant relative to the seat, the seat being mounted on a vehicle floor and including a seat base and a seatback, the method comprising:

providing an airbag having a stored, pre-deployment condition in a roof of the vehicle above the seat;

inflating the airbag downward from the vehicle roof toward the vehicle floor to a deployed condition;

configuring an upper portion of the airbag to, in the deployed condition, extend from the roof down in front of the seatback and terminate above the seat base;

configuring the upper portion to have a rear surface that faces the seatback and a front surface that faces away from the seatback;

configuring a lower portion of the airbag to, in the deployed condition, extend downward and forward from the front surface of the upper portion;

configuring the lower portion to, in the deployed condition, extend in front of the seat base and below an upper surface of the seat base;

configuring the upper portion to receive a head and torso of the occupant when moving forward in response to the collision;

configuring the lower portion to receive lower legs of the occupant when moving forward in response to the collision, the lower legs being positioned forward of the seat base and extending below the upper surface of the seat base with feet of the occupant resting on the vehicle floor; and configuring the airbag so that the occupant's head and torso moving forward into engagement with the upper portion produces a rotation of the airbag that results in the lower portion exerting a downward force on the occupant's lower legs.

12. The method recited in claim 11, further comprising configuring the lower portion to engage the occupant's lower legs and resist forward and upward swinging of the lower legs about knees of the occupant.

13. The method recited in claim 11, further comprising configuring the lower portion to engage the occupant's lower legs in an area of tibias of the lower legs so that forces of forward and upward swinging of the lower legs about knees of the occupant are distributed over a large area of the lower legs.

14. The method recited in claim 11, further comprising configuring the upper portion of the airbag to pivot and/or rotate forward in response to forward movement of the occupant's head and torso, and configuring the forward pivotal and/or rotational movement of the upper portion to produce forward and downward movement of the lower portion of the airbag in opposition to forward and upward swing of the occupant's lower legs about knees of the occupant.

15. The method recited in claim 14, further comprising configuring the airbag to maintain a level of pressurization such that the lower portion can resist movement relative to the upper portion in response to forward and upward swing of the occupant's lower legs about the knees of the occupant.

16. The method recited in claim 11, further comprising configuring the upper portion to extend downward from the vehicle roof in front of the occupant's head and torso and terminate adjacent and above upper legs of the occupant, and comprising the lower portion to branch off from the upper portion at a location above a terminal lower end of the upper portion.

17. The method recited in claim 11, further comprising configuring the upper portion to engage the vehicle roof when inflated and to maintain engagement with the vehicle roof throughout deployment.

18. The method recited in claim 11, further comprising configuring the upper portion to extend downward and rearward from the vehicle roof when inflated, and configuring the lower portion to extend downward and forward from the upper portion when inflated.

19. The method recited in claim 11, further comprising configuring the airbag to be free from engagement with vehicle structure against which the airbag is pinned in response to occupant penetration into the airbag when inflated.

20. The method recited in claim 11, further comprising configuring the airbag to help protect an occupant that is wearing a seatbelt.

* * * * *